US008238478B2

(12) United States Patent
Perrins et al.

(10) Patent No.: US 8,238,478 B2
(45) Date of Patent: Aug. 7, 2012

(54) MULTI-SYMBOL NONCOHERENT CPM DETECTOR HAVING A TRELLIS STRUCTURE AND A LOCK DETECTOR THEREFORE

(75) Inventors: Erik S. Perrins, Lawrence, KS (US); Terrance J Hill, West Chester, OH (US)

(73) Assignee: Quasonix, LLC, West Chester, OH (US)

( * ) Notice: Subject to any disclaimer, the term of this patent is extended or adjusted under 35 U.S.C. 154(b) by 708 days.

(21) Appl. No.: 12/366,876

(22) Filed: Feb. 6, 2009

(65) Prior Publication Data

US 2009/0175384 A1    Jul. 9, 2009

Related U.S. Application Data

(63) Continuation-in-part of application No. 11/369,627, filed on Mar. 7, 2006, now abandoned, which is a continuation-in-part of application No. 11/252,108, filed on Oct. 17, 2005, now abandoned, which is a continuation-in-part of application No. 11/534,899, filed on Sep. 25, 2006.

(60) Provisional application No. 60/619,101, filed on Oct. 15, 2004, provisional application No. 60/720,342, filed on Sep. 23, 2005.

(51) Int. Cl.
*H04L 27/00* (2006.01)

(52) U.S. Cl. ........................................................ 375/324

(58) Field of Classification Search ........................ None
See application file for complete search history.

(56) References Cited

U.S. PATENT DOCUMENTS

| | | | | |
|---|---|---|---|---|
| 5,610,940 A | * | 3/1997 | Durrant et al. | 375/150 |
| 5,633,893 A | | 5/1997 | Lampe et al. | |
| 5,659,574 A | | 8/1997 | Durrant et al. | |
| 5,761,239 A | | 6/1998 | Gold et al. | |
| 5,841,817 A | * | 11/1998 | Krieger et al. | 375/340 |
| 6,233,290 B1 | * | 5/2001 | Raphaeli | 375/341 |
| 6,690,739 B1 | * | 2/2004 | Mui | 375/265 |

* cited by examiner

*Primary Examiner* — Leon-Viet Nguyen
(74) *Attorney, Agent, or Firm* — Tucker Ellis LLC

(57) ABSTRACT

Multi-symbol non-coherent continuous phase modulation (CPM) detectors having a trellis structure, methods of continuous phase detection using a trellis structure, and trellis-based lock detectors and methods for digitally modulated signals are described. The continuous phase modulation detector includes receiver, observation, memory, and adjustment portions. The receiver has a trellis structure and is adapted for receiving digitally modulated signals having a generally continuous phase. The observation portion is adapted for performing multi-symbol observations on received digitally modulated signals and the memory is adapted for storing historic observation data corresponding to multi-symbol observations performed by the observation portion. The adjustment portion is adapted for selectively adjusting the receiver in accordance with stored historic observation data. A trellis-based lock detector computes a global survivor for consecutive time indexes as a maximum cumulative branch metric corresponding to a given time index for consecutive branches of the trellis structure.

35 Claims, 5 Drawing Sheets

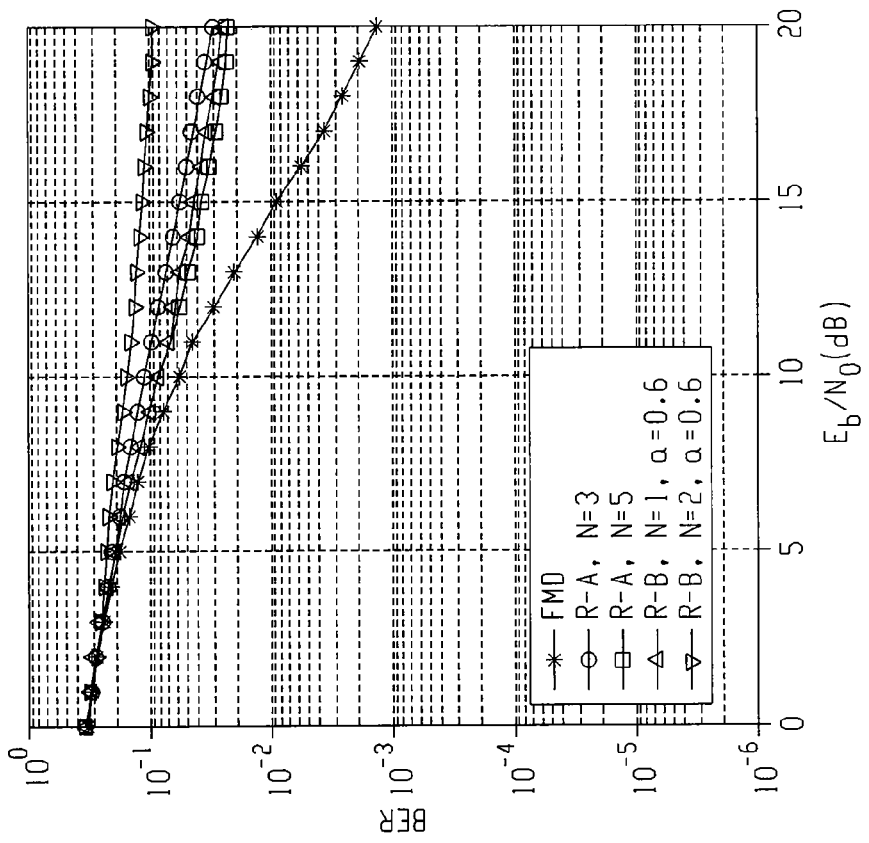
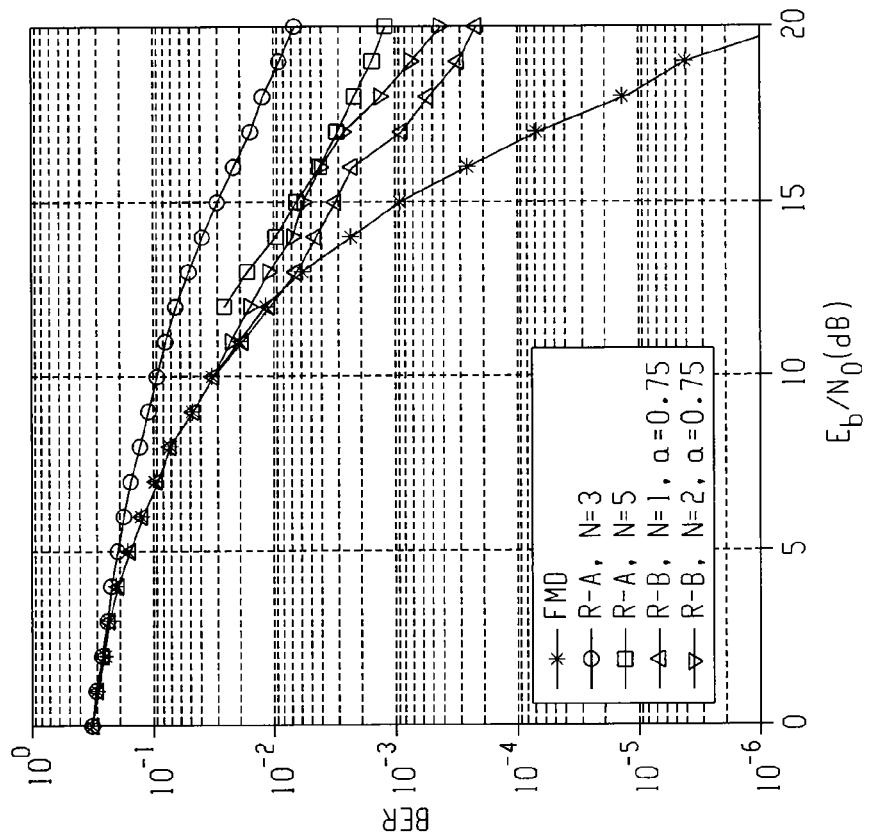
Fig. 3B
Fig. 3A

MULTI-SYMBOL NONCOHERENT CPM DETECTOR HAVING A TRELLIS STRUCTURE AND A LOCK DETECTOR THEREFORE

This application is a continuation-in-part of U.S. patent application Ser. No. 11/369,627 filed Mar. 7, 2006 now abandoned which is a continuation-in part of U.S. patent application Ser. No. 11/252,108 filed Oct. 17, 2005, now abandoned which claims the benefit of U.S. Provisional Patent Application Ser. No. 60/619,101 filed Oct. 15, 2004, and of U.S. patent application Ser. No. 11/534,899 filed Sep. 25, 2006 which claims the benefit of U.S. Provisional Patent Application Ser. No. 60/720,342 filed on Sep. 23, 2005.

BACKGROUND

The Advanced Range Telemetry (ARTM) program is a United States Department of Defense tri-service telemetry modernization project whose goal is to assure that all testing and training ranges are able to use telemetry as necessary to carry out their respective missions. Multi-h Continuous Phase Modulation (CPM) has been selected by the ARTM Joint Programs Office as the Tier II ARTM waveform, because it offers significant improvements over both legacy telemetry waveforms such as pulse coded modulation/frequency modulation ("PCM/FM") and the previous Tier I waveform known as the Feher-patented quadrature-phase-shift keying ("FQPSK") in terms of spectral containment and detection efficiency, while retaining a constant envelope characteristic.

The ARTM Tier II modulation format is a multi-h continuous phase modulation. Those skilled in the art will appreciate that the multi-h continuous phase modulation format has a constant envelope and narrow bandwidth. Current implementations of receivers for multi-h continuous phase modulation experience several difficulties, including that the branch metrics are solely a function of the data in the multi-symbol observation window. That is, the influence of previous observations is not passed along in the form of a cumulative path metric. The skilled artisan will appreciate that the performance improves as the multi-symbol observation length increases; however, the penalty for this is that trellis complexity increases exponentially with increasing observation length. In addition, the current implementations perform poorly for practical multi-symbol observation lengths with respect to the Advanced Range Telemetry Tier II modulation format. Thus, the existing optimal maximum likelihood sequence estimation receiver for continuous phase modulation may have high complexity, both in trellis size and coherent demodulation requirements.

Lock detectors have been provided for use with digitally modulated signal detectors. Previously known carrier lock detectors are typically implemented as phase lock loop detectors, delay-locked loop detectors, or signal power detectors. The performance of lock detectors of these types is dependant on the carrier signal amplitude. This being the case, at low levels of signal to noise ratio, previously known lock detectors may indicate an out-of-lock condition even though the carrier is still locked.

Also known in the art, are more advanced lock detectors that are signal amplitude independent. However lock detectors of this type exhibit high complexity.

Thus, there is a need for a carrier lock detector and method for carrier lock detection that overcome the above-mentioned problems.

It would be desirable to have a carrier lock detector and method that are not dependant on the amplitude of the carrier signal.

Further, it is desirable to be able to reliably discriminate between a digitally modulated informative signal with a very poor signal to noise ratio, and no signal whatsoever.

It would be also desirable to have a carrier lock detector and method capable of providing reliable lock information even at very low signal to noise ratio, while simplifying hardware requirements.

In view of the above, there is provided in accordance with the embodiments disclosed herein an improved, noncoherent receiver capable of providing multi-symbol observation. Further in view of the above, there is provided in accordance with the embodiments disclosed herein an improved lock detector and a lock detection method.

SUMMARY OF INVENTION

In accordance with the example embodiments, there is provided a continuous phase modulation detector having a trellis structure, a method for continuous phase modulation detection, a lock detector, and a lock detection method therefor. One embodiment in particular, is directed to a multi-h continuous phase modulation detector.

Still further, in accordance with an embodiment, there is provided a noncoherent receiver capable of allowing multi-symbol observation.

More particularly in accordance with an embodiment, there is provided a continuous phase modulation detector. The continuous phase modulation detector includes receiver means adapted to receive digitally modulated signals having a generally continuous phase. The detector also includes observation means adapted to perform multi-symbol observations on received digitally modulated signals. Memory means are included in the detector and adapted to store historic observation data corresponding to multi-symbol observations performed by the observation means. The detector further includes adjustment means adapted to selectively adjust the observation means according to the stored historic observation data.

In one embodiment, the receiver means is noncoherent and allows for the controlled use of a cumulative metric, wherein the reliance on past observations is adjusted recursively in accordance with cumulatively acquired observation data. Preferably, the adjustment is based on a "forget factor". Using the cumulative metric, the receiver of this embodiment is able to perform well while keeping the multi-symbol observation length to a minimum. This embodiment is equally applicable to both PCM/FM and ARTM Tier II waveforms. In the context of PCM/FM, a two-symbol observation length (4 trellis states) is a few tenths of a dB inferior to the optimal maximum likelihood sequence estimating receiver, and is 3.5 dB superior to conventional FM demodulation. In the context of ARTM Tier II, the same two symbol observation length (64 states) is 2 dB inferior to the maximum likelihood sequence estimating receiver and 4 dB superior to FM demodulation.

Further, in accordance with an embodiment, there is provided a method for continuous phase modulation detection. The method begins with the receipt of digitally modulated signals having a generally continuous phase by a receiver. Multi-symbol observations are then performed on the received digitally modulated signals. Historic observation data corresponding to multi-symbol observations performed on the digitally modulated signals is then stored and the observation means is selectively adjusted according to the stored historic observation data.

In one embodiment, the receiver is noncoherent and allows for the controlled use of a cumulative metric, wherein the reliance on past observations is adjusted recursively according to the cumulatively acquired observation data. In the preferred embodiment, the adjustment is based on a forget factor. In accordance with this embodiment, the receiver uses the cumulative metric to perform well while keeping the multi-symbol observation length to a minimum. This embodiment is equally applicable to both PCM/FM and ARTM Tier II waveforms. In the context of PCM/FM, a two-symbol observation length (4 trellis states) is a few tenths of a dB inferior to the optimal maximum likelihood sequence estimating receiver, and is 3.5 dB superior to conventional FM demodulation. In the context of ARTM Tier II, the same two symbol observation length (64 states) is 2 dB inferior to the maximum likelihood sequence estimating receiver and 4 dB superior to FM demodulation.

In accordance with yet another aspect of the subject application, there are provided a carrier lock detector and method for carrier lock detection that are not dependent on the amplitude of the carrier signal.

Further, in accordance with the subject application, there are provided a trellis-based lock detector and a trellis-based method for carrier lock detection that simplify hardware requirements.

Still further, in accordance with the present invention, there are provided a trellis lock detector and a trellis-based method for carrier lock detection capable of providing reliable lock information.

In accordance with one aspect of the present invention, there is provided a trellis-based lock detector including receiving means adapted for receiving an incoming signal and observation means adapted for performing multi-symbol observations on the received signal. The incoming signal is at least one of the following: a digitally modulated informative signal, and a noise signal. The trellis-based lock detector also includes cumulative means and memory means. The cumulative means is adapted for acquiring cumulative observation data by recursively computing observation data corresponding to multi-symbol observations. The memory means is adapted for storing cumulative observation data in a traceback matrix. The trellis-based lock detector further includes evaluating means and decision means. The evaluating means is adapted for evaluating the cumulative observation data stored in the traceback matrix. The decision means is adapted for making a decision on a status of the trellis-based lock detector based on the evaluation of acquired cumulative observation data. The decision is made by selecting from the group consisting of: a lock status, and unlock status.

In a preferred embodiment, the cumulative means is further adapted for recursively computing a global survivor for consecutive time indexes. The global survivor is suitably computed as a maximum cumulative branch metric corresponding to a given time index for consecutive branches of the trellis structure.

The evaluating means is, preferably, further adapted for backtracing a global survivor for a given time index to a previous time index. In this embodiment, the evaluating means is further adapted for determining a global survivor condition for the previous time index, the condition being selected from the group consisting of: a true condition, and a false condition.

In another preferred embodiment, the evaluating means is further adapted for recursively computing the number of consecutive true conditions for a global survivor over an averaging time. The evaluating means is also adapted for obtaining data representative of the number of consecutive true conditions for a global survivor over an averaging time. In this embodiment, the decision means is further adapted for selecting a status of the trellis-based lock detector by comparing the obtained data with at least one threshold data. Preferably, the observation means further includes means for adjusting a multi-symbol observation length.

In accordance with another aspect of the present invention, there is provided a trellis-based method for lock detection of a digitally modulated informative signal. According to the method, an incoming signal is received, wherein the incoming signal is at least one of the following: a digitally modulated informative signal, and a noise signal. Next, multi-symbol observations are performed on the received signal, and cumulative observation data is acquired by recursively computing observation data corresponding to the multi-symbol observations. Acquired cumulative observation data corresponding to the multi-symbol observations is then stored in a traceback matrix, and evaluated. Next, based on the evaluation of acquired cumulative observation data, a decision on a status of the digitally modulated informative signal is made by selecting from the group consisting of: a lock status, and unlock status.

In a preferred embodiment, the step of acquiring cumulative observation data further includes the step of recursively computing a global survivor for consecutive time indexes. The global survivor is recursively computed as a maximum cumulative branch metric corresponding to a given time index for consecutive branches of the trellis structure.

The step of evaluating, preferably, includes the step of backtracing a global survivor for a given time index to a previous time index. In this embodiment, the step of evaluating further includes the step of determining a global survivor condition for the previous time index. The condition for the previous time index is selected from the group consisting of: a true condition, and a false condition.

The step of evaluating, preferably, includes the step of recursively computing the number of consecutive true conditions for a global survivor over an averaging time, and obtaining data representative of the number of consecutive true conditions for a global survivor over an averaging time. In this embodiment, the step of making a decision further includes the step of comparing the obtained data with at least one threshold data, selecting thereby the status of the digitally modulated informative signal.

Thus, the design of the trellis-based lock detector and the trellis-based method for lock detection of a digitally modulated informative signal of the subject invention are based on a concept that for a noise signal entering the receiving means, the probability of a long succession of true evaluations of a global survivor is very small. In contrast, an informative signal present at the input of the receiving means, results in the global survivor following a consistent path for consecutive time indexes. The latter allows for using data, representative of the number of consecutive true conditions for a global survivor over an averaging time, as an informative parameter for making a decision on the status of lock detection. Still other objects and aspects of the present invention will become readily apparent to those skilled in this art from the following description wherein there is shown and described a preferred embodiment of this invention, simply by way of illustration of one of the best modes suited for to carry out the invention. As it will be realized by those skilled in the art, the invention is capable of other different embodiments and its several details are capable of modifications in various obvious aspects all without departing from the invention. Accordingly, the drawings and description will be regarded as illustrative in nature and not as restrictive.

Still other objects and aspects of the embodiments will become readily apparent to those skilled in this art from the following description wherein there is shown and described preferred embodiments, simply by way of illustration of one of the best modes suited for to carry out the claimed invention. As it will be realized by those skilled in the art, the invention is capable of other different embodiments and its several details are capable of modifications in various obvious aspects all without from the invention. Accordingly, the drawing and descriptions will be regarded as illustrative in nature and not as restrictive.

Embodiments disclosed herein also relate generally to lock detectors for digital communication systems. More particularly, one embodiment is directed to a lock detector having a trellis structure and a method for lock detection that provide indication of tracking a carrier signal. The trellis based lock detector and trellis-based method for lock detection of the present application are capable of being advantageously used in communication systems designed to convey signals employing any type of digital modulation, that are capable of being described by a trellis, such as, for example, and without limitation, pulse width modulation/frequency modulation (PCM/FM), Feher-patented quadrature-phase-shift keying (FQPSK), shaped offset quadrature-phase-shift keying (SOQPSK), and all forms of continuous phase modulation (CPM).

BRIEF DESCRIPTION OF THE DRAWINGS

The subject embodiments are described in connection with the attached drawings which are for the purpose of illustrating the preferred embodiments only, and not for the purpose of limiting the same, wherein:

FIG. 3A illustrates graphically additional performance curves in connection with the subject invention;

FIG. 3B illustrates graphically additional performance curves in connection with the subject invention;

DETAILED DESCRIPTION OF THE EMBODIMENTS

Figure 1:
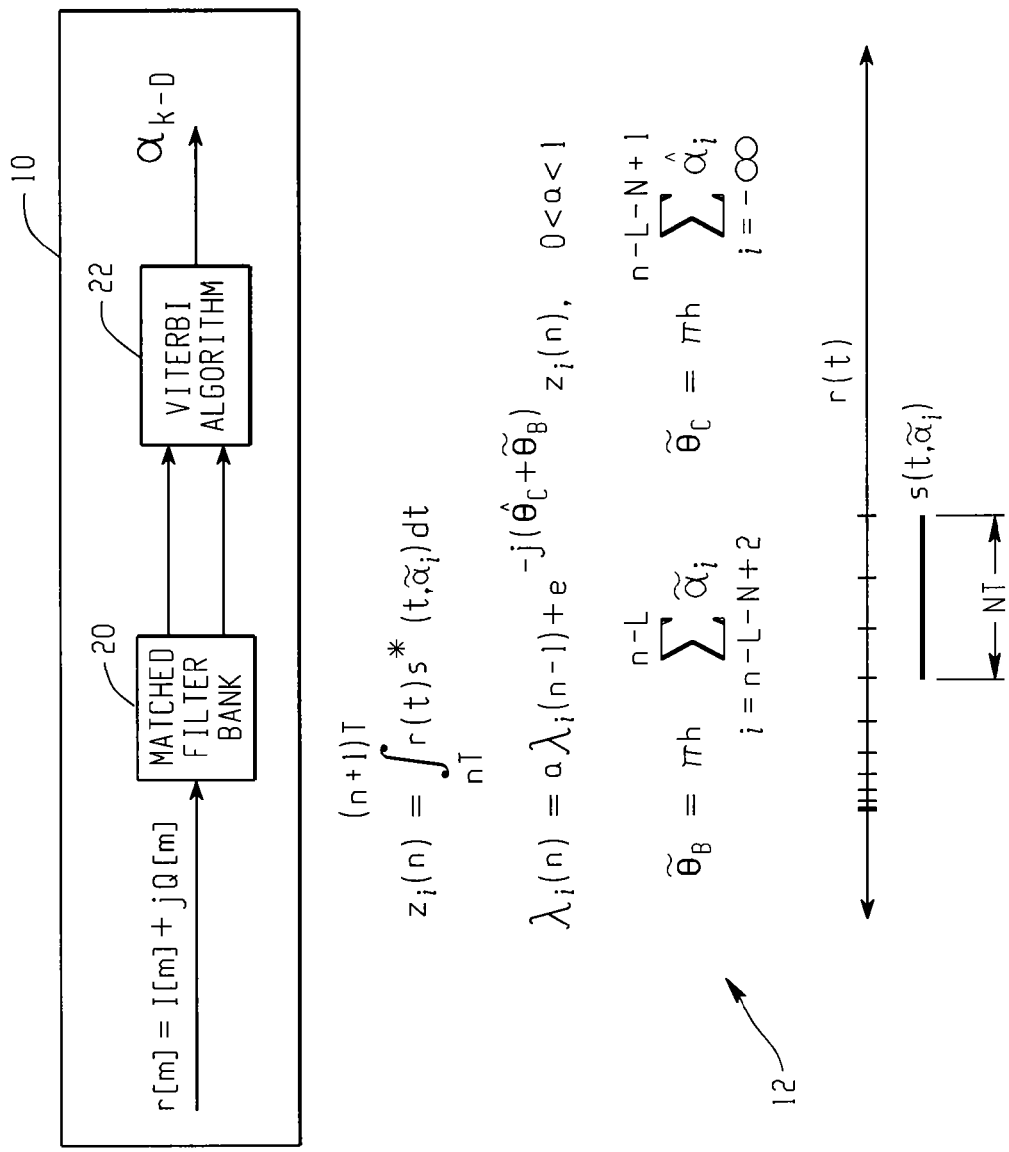
FIG. 1 illustrates a demodulator diagram and equations in connection with an embodiment.

The present embodiments are directed to a noncoherent receiver capable of allowing multi-symbol observation and to a lock detector therefor. In particular, the present embodiments are directed to a continuous phase modulation detector, a method for continuous phase modulation detection, a lock detector, and a method of lock detection.

One embodiment of the subject application is directed to lock detectors for digital communication systems. More particularly, the subject application is directed to a lock detector suitable for signals having a trellis structure and a trellis-based method for lock detection that provide indication of tracking a carrier signal. It will become apparent to those skilled in the art that the trellis-based lock detector and the trellis-based method for lock detection of the present application are capable of being advantageously used in communication systems designed to convey signals employing any type of digital modulation which can be described by a trellis structure, such as, for example, and without limitation, pulse width modulation/frequency modulation (PCM/FM), Feher-patented quadrature-phase-shift keying (FQPSK), shaped offset quadrature-phase-shift keying (SOQPSK), and all forms of continuous phase modulation (CPM).

Continuous phase modulation refers to a general class of digitally modulated signals in which the phase is constrained to be continuous. The complex-baseband signal is expressed as:

$$s(t) = \exp(j\psi(t, \alpha)) \tag{1}$$

$$\psi(t, \alpha) = 2\pi \sum_{i=-\infty}^{n} \alpha_i h_{(i)} q(t - iT), \, nT < t < (n+1)T \tag{2}$$

where T is the symbol duration, $h_{(i)}$ are the modulation indices, $\alpha = \{\alpha_i\}$ are the information symbols in the M-ary alphabet $\{\pm 1, \pm 3, \ldots \pm (M-1)\}$, and q(t) is the phase pulse. The subscript notation on the modulation indices is defined as:

$$h_{(i)} \equiv h_{(i \bmod N_h)}$$

where $N_h$ is the number of modulation indices (for the special case of single-h continuous phase modulation, $N_h=1$). The phase pulse q(t) is related to the frequency pulse f(t) by the relationship:

$$q(t) = \int_0^t f(\tau)\,d\tau. \tag{4}$$

The frequency pulse is time-limited to the interval (0,LT) and is subject to the constraints:

$$f(t) = f(LT - t), \quad \int_0^{LT} f(\tau)\,d\tau = q(LT) = \frac{1}{2} \tag{5}$$

In light of the constraints on f(t) and q(t), Equation (2) is suitably written as:

$$\psi(t, \alpha) = \theta(t, \alpha_n) + \theta_{n-L} = 2\pi \sum_{i=n-L+1}^{n} \alpha_i h_{(i)} q(t - iT) + \pi \sum \alpha_i h_i \bmod 2\pi. \tag{6}$$

The term $\theta(t,\alpha_n)$ is a function of the L symbols being modulated by the phase pulse. For $h_{(i)}=2k_{(i)}/p$ ($k_{(i)}$, p integers), the phase state $\theta_{n-L}$ takes on p distinct values 0, $2\pi/p$, $2\cdot 2\pi/p, \ldots, (p-1)\, 2\pi/p$. The total number of states is $pM^{L-1}$, with M branches at each state. Each branch is defined by the L+1-tuple $\sigma_n = (\theta_{n-L}, \alpha_{n-L+1}, \alpha_{n-L+2}, \ldots, \alpha_n)$. The Advanced Range Telemetry Tier II modulation is M=4, h=\{4/16, 5/16\} ($N_h$=2), 3RC (raised cosine frequency pulse of length L=3).

In accordance with the present invention, the model for the received complex-baseband signal is denoted by the equation:

$$r(t) = s(t,\alpha) e^{j\phi(t)} + n(t) \tag{7}$$

wherein n(t)=x(t)+jy(t) is complex-valued additive white Gaussian noise with zero-mean and single-sided power spectral density $N_0$. The phase shift $\phi(t)$ introduced by the channel is unknown in general.

Those skilled in the art will appreciate that there are a plurality of instances wherein this signal model is considered. For example and without limitation, the binary continuous phase frequency shift keying ("CPFSK") case assumes φ(t) to be uniformly distributed over the interval [−π, π]. It is also assumed to be slowly varying so that it is constant over a multi-symbol observation interval NT. The receiver correlates the received signal against all possible transmitted sequences of length NT and outputs the maximum likelihood decision on the middle bit in the observation.

With respect to the more general continuous phase modulation example, φ(t) is modeled as a slowly varying process with the Tikhonov distribution. The Tikhonov distribution is parameterized by P and has three important special cases: the fully coherent case where β=∞, the non-coherent case where β=0 and φ(t) reduces to a uniformly distributed value over [−π, π], and the partially coherent case where 0<β<∞.

FIG. 1 shows a diagram of a demodulator 10 and equations 12 in accordance with an embodiment. As illustrated, the demodulator 10 includes, generally, a matched filter bank 20 and a processing portion 22 including logic within the processing portion for performing multi-symbol non-coherent CPM detection in accordance with the embodiments disclosed herein and lock detection in accordance with the embodiments disclosed herein.

Figure 2:
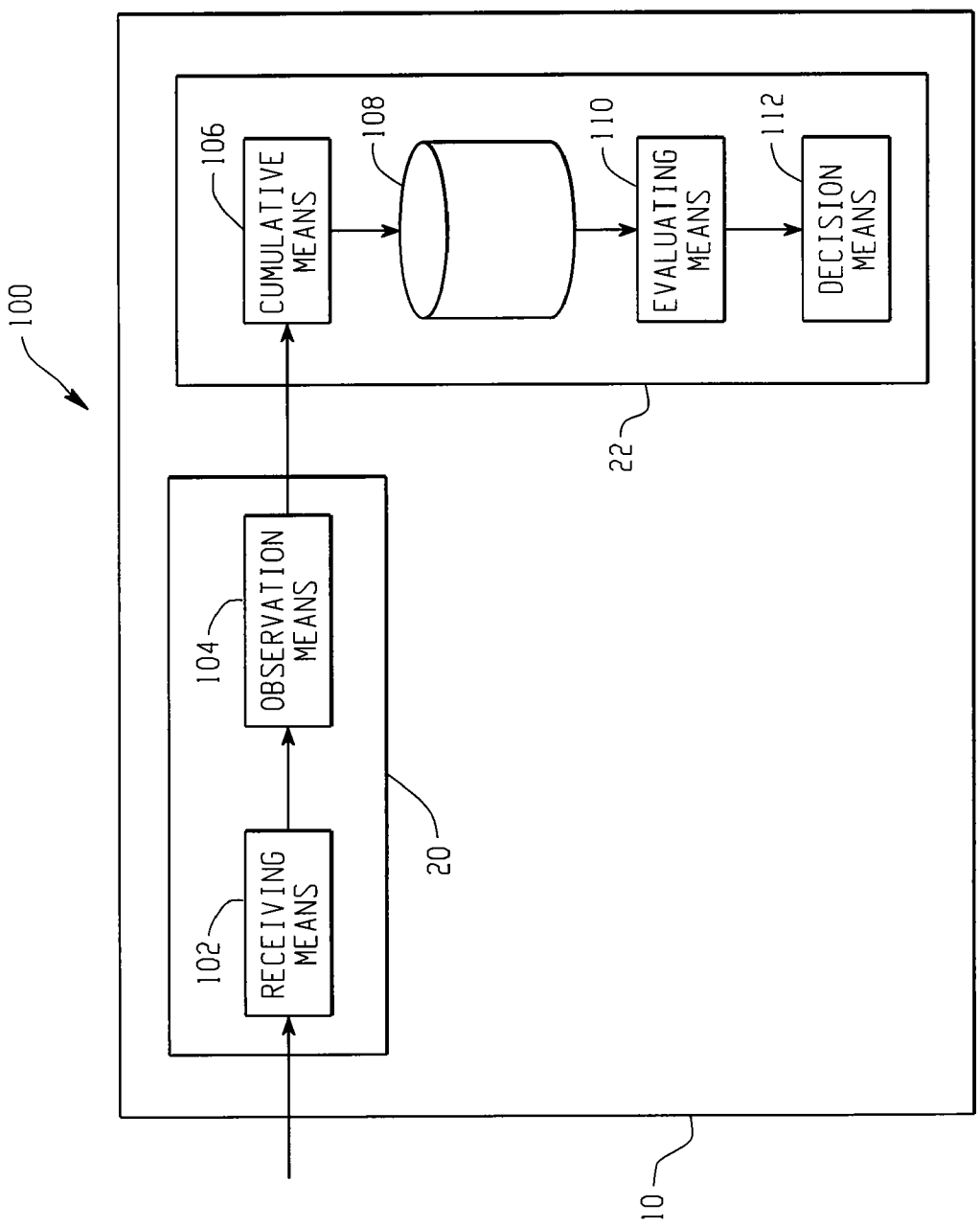
FIG. 2 is a block diagram of one preferred embodiment of the trellis-based lock detector in accordance with the subject application.

The demodulator is shown in greater detail in FIG. 2 illustrating the circuits thereof in functional block diagram form. With reference now to that Figure, the demodulator is in the form of a continuous phase modulation detector 100 including a receiver means 102 adapted to receive digitally modulated signals having a generally continuous phase. The detector 100 also includes observation means 104 adapted to perform multi-symbol observations on received digitally modulated signals. Memory means 108 are included in the detector and adapted to store historic observation data corresponding to multi-symbol observations performed by the observation means 104. The detector 100 further includes adjustment means 112 adapted to selectively adjust the receiver means 102 according to the historic observation data stored in the memory means 108.

Receiver A

A practical receiver implemented in one embodiment in the circuits of FIGS. 1 and 2 is given for the non-coherent case (β=0), which is a generalization of the CPFSK receiver. This more general receiver has the complex-valued decision variable:

$$\lambda_{\tilde{\alpha}}(n) = \int_{(n-N_1)T}^{(n+N_2)T} r(\tau)e^{-j\theta(\tau,\tilde{\alpha})} e^{-j\tilde{\theta}_{k-L}} dt, \quad (8)$$

$$nT < t < (n+1)T \quad kT \leq \tau \leq (k+1)T$$

$$= \lambda_{\tilde{\alpha}}(n-1) - e^{-j\tilde{\theta}_{n-1-L-N_1}} \int_{(n-1-N_1)T}^{(n-N_1)T} r(\tau)e^{-j\theta(\tau,\tilde{\alpha})} dt + \quad (9)$$

$$e^{-j\tilde{\theta}_{n-1-L+N_2}} \int_{(n-1+N_2)T}^{(n+N_2)T} r(\tau)e^{-j\theta(\tau,\tilde{\alpha})} dt$$

$$\tilde{\theta}_{k-L} = \pi \sum_{l=-\infty}^{k-L} \tilde{\alpha}_l h_{(l)} \mod 2\pi \quad (10)$$

where $\tilde{\alpha}$ is a hypothesized data sequence and the observation interval is $N_1+N_2=N$ symbol times. The term $\tilde{\theta}_{k-L}$ accumulates the phase of the hypothesized symbols after they have been modulated by the length-LT phase pulse $e^{-j\theta(\tau,\tilde{\alpha})}$; it is necessary to match the phase of the individual length-T segments of the integral in Equation (8). Equation (9) shows that this metric is suitably computed recursively using the Viterbi algorithm with a trellis of $M^{L+N-2}$ states. It is important to point out that the recursion does not maintain a cumulative path metric, but rather functions as a sliding window that sums N individual length-T correlations (each rotated by the proper phase). The receiver does not perform a traceback operation to determine the output symbol, but instead outputs the symbol $\tilde{\alpha}_n$ corresponding to the metric λ(n) with the largest magnitude (the symbol $\tilde{\alpha}_n$ is the $N_1$-th symbol in the length-N observation, which is not necessarily the middle symbol). Since φ(t) is assumed to be constant over the N-symbol observation interval, the magnitude of the metric λ(n) is statistically independent of the channel pulse.

There are two difficulties with the receiver described by Equation (8). The first difficulty is the number of states grows exponentially with the observation interval N. The second difficulty is that, depending on the particular continuous phase modulation scheme, a large value for N is capable of being required to achieve adequate performance.

Receiver B (N=1)

According to an embodiment, the preceding difficulties are addressed by a receiver implemented in the circuits of FIGS. 1 and 2 and as described the recursive metric:

$$\lambda_{\tilde{\alpha}}(n) = a\lambda_{\tilde{\alpha}}(n-1) + e^{-j\hat{\theta}_{n-L}^{(i)}} z_{\tilde{\alpha}}(n) \quad (11)$$

$$z_{\tilde{\alpha}}(n) = \int_{nT}^{(n+1)T} r(\tau)e^{-j\theta(\tau,\tilde{\alpha})} d\tau \quad (12)$$

$$\hat{\theta}_{n-L}^{(i)} = \pi \sum_{k=-\infty}^{n-L} \hat{\alpha}_k^{(i)} h_{(k)} \mod 2\pi \quad (13)$$

wherein the forget factor a is in the range 0≤a≤1. The term $\hat{\theta}_{n-L}^{(i)}$ represents the phase contribution of all previous symbol decisions $\hat{\alpha}_k^{(i)}$ for the i-th state in the trellis. Each state in the trellis stores two values: a cumulative metric λ(n−1), and a cumulative phase $\hat{\theta}_{n-L}^{(i)}$. The receiver uses a traceback matrix of length DD to output the symbol $\hat{\alpha}_{n-DD}^{(i)}$ corresponding to the state whose metric has the largest magnitude. Here, the branch metric λ(n) is only a function of the L symbols being modulated by the phase pulse q(t), thus the number of states is $M^{L-1}$. For the special case of a=1 this branch metric reduces to:

$$\lambda_{\tilde{\alpha}}(n) = \sum_{k=-\infty}^{n} a^{n-i} e^{-j\hat{\theta}_{k-L}^{(i)}} \int_{kT}^{(k+1)T} r(\tau)e^{-j\theta(\tau,\tilde{\alpha})} d\tau \quad (14)$$

$$= \int_{-\infty}^{(n+N_1)T} r(\tau)e^{-j\theta(\tau,\tilde{\alpha})} e^{-j\hat{\theta}_{k-L}} d\tau, kT \leq \tau \leq (k+1)T \quad (15)$$

This identifies an important tradeoff. As a approaches unity, the branch metric in Equation (11) approaches the one in Equation (15). The metric in Equation (15) is a loose approximation to an infinitely long observation interval because it "remembers" previous observations through the use of a cumulative metric. The optimal maximum likelihood sequence estimating receiver also uses a cumulative metric to recursively compute a correlation from (∞,(n+1)T). The only difference is the non-coherent receiver cannot account for the phase states $\theta_{n-L}$ (shown in Equation (6)) in the trellis since the magnitude of the metrics (rather than the real part for the maximum likelihood sequence estimating receiver case) is used to determine survivors. However, when the slowly varying channel phase φ(t) is taken into account, the branch metric in Equation (15) will trace a curved path in the complex plane as φ(t) changes. This will reduce the magnitude of the metric and increase the probability that the competing paths through the trellis will have metrics with a magnitude larger than the true path. As a approaches zero, the branch metrics "forget" the infinite past more quickly and allow φ(t) to change more rapidly with less impact on the magnitude of the branch metrics.

Receiver B (N≧1)

Those of ordinary skill in the art will appreciate that the metric, described in Equation (11), is capable of being extended to more closely approximate an infinitely long observation interval. The reason for the inherently loose approximation in Equation (11) is that the trellis only allows for $M^{L-1}$ states, when the underlying continuous phase modulation signal is described by $pM^{L-1}$ states, where the p-fold increase is due to the phase states $\theta_{n-L}$. The extended metric for an observation interval of length N≧1 is given by:

$$\lambda_{\tilde{\alpha}}(n) = a\lambda_{\tilde{\alpha}}(n-1) + e^{-j\tilde{\theta}_{n-L-N+1}^{(i)}} z_{\tilde{\alpha}}(n) \quad (16)$$

$$z_{\tilde{\alpha}}(n) = e^{-j\tilde{\theta}_{n-L}} \int_{nT}^{(n+1)T} r(\tau) e^{-j\theta(\tau,\tilde{\alpha})} d\tau \quad (17)$$

$$\tilde{\theta}_{n-L} = \pi \sum_{k=n-L-N+2}^{n-L} \tilde{\alpha}_k h_{(k)} \bmod 2\pi \quad (18)$$

It will be understood by those skilled in the art that an important difference between Equations (11)-(13) and Equations (16)-(18) is that N−1 symbols have been removed from the cumulative phase $\tilde{\theta}_{n-L-N+1}^{(i)}$ to form $\tilde{\theta}_{n-L}$ which is associated with the branch metric. Thus, as paths merge and survivors are determined, more options are kept open in the trellis. The number of states in this trellis is $M^{L-N-2}$.

As used hereinafter, the receiver defined in Equations (8)-(10) is denoted as "Receiver-A", and the receiver defined in Equations (16)-(18) as "Receiver-B". The skilled artisan will appreciate that Equations (11)-(13) define Receiver-B, wherein N=1. Both receivers have the parameter N, which is the multi-symbol observation length. Receiver-B is also parameterized by the forget factor a.

Receiver C

An alternate embodiment of Receiver-B implemented in the circuits of FIGS. 1 and 2 in an embodiment is given by:

$$\lambda_{\tilde{\alpha}}(n) = \lambda_{\tilde{\alpha}}(n-1) + \text{Re}\left\{ e^{-j\tilde{\theta}_{n-L-N+1}^{(i)}} z_{\tilde{\alpha}}(n) Q_{\tilde{\alpha}}^*(n-1) \right\} \quad (19)$$

$$Q_{\tilde{\alpha}}(n) = aQ_{\tilde{\alpha}}(n-1) + (1-a)e^{-j\tilde{\theta}_{n-L-N+1}^{(i)}} z_{\tilde{\alpha}}(n) \quad (20)$$

The receiver defined in Equations (19)-(20) is denoted as "Receiver-C". The skilled artisan will appreciate that Receiver-C is different from Receiver-B in that the cumulative metric λ(n) is real-valued, and the noncoherent phase is resolved by the phase reference Q(n). Those skilled in the art will understand that Receiver-C is similar to Receiver-B, such that Receiver-C is parameterized by the forget factor a and multi-symbol observation interval N. Receiver-C also uses the same variables, z(n), $\tilde{\theta}_{n-L-N+1}^{(i)}$, and $\tilde{\theta}_{n-L}$ as are found in Receiver-B. It will be apparent to the skilled artisan that due to the similarities between Receivers-B and -C, the performance results discussed below are given only for Receiver-B, but can be regarded as typical for Receiver-C.

The first continuous phase modulation scheme considered is the PCM/FM waveform, which is M=2, h=7/10, 2RC, illustrated as FIG. 3A. It will be understood by those skilled in the art that this is actually an approximation, where 2RC is very close to the standard fourth order Bessel pre-modulation filter. FIG. 3A illustrates two curves each for Receivers-A and -B, where the observation lengths are N=2, and a=0.9. Those skilled in the art will appreciate that the value of a=0.9 was found to yield the best receiver performance. The performance of the optimal maximum likelihood sequence estimating receiver is also shown as a reference. Receiver-A with N=5 yields an improvement of 2.5 dB over the traditional FM demodulator. FIG. 3A also shows that Receiver-B produces additional performance improvement over Receiver-A, in addition to requiring shorter observation intervals. At BER=$10^{-6}$, Receiver-B with N=1 performs with 1 dB improvement over Receiver-A with N=3; these receivers have a trellis of 2 and 8 states respectively. A 0.7 dB improvement also exists for Receiver-B with N=2 (4 states) over Receiver-A with N=5 (32 states). FIG. 3A indicates that Receiver-B with N=2 performs very close to the optimal maximum likelihood sequence estimating receiver, which shows there is little to be gained by further increasing N for this continuous phase modulation scheme.

The next continuous phase modulation scheme in the simulations is the Advanced Range Telemetry Tier II waveform, which is M=4, h=7/10, {4/16, 5/16}, 3RC. FIG. 3B shows the same set of six curves in the previous PCM/FM example. Here the results are very different. Receiver-A is shown to perform at a loss relative to the FM demodulator. At BER=$10^{-6}$ this loss is 1 dB for N=5, and 7 dB for N=3. This is a surprising result when considering that these receivers have 4096 and 256 states respectively. The sharp difference in the performance of Receiver-A for these two continuous phase modulation schemes would likely be explained by differences in distance properties of the two waveforms under noncoherent reception. It has been shown that some continuous phase modulation schemes require much larger values of N to achieve noncoherent performance close to the coherent case; however, analysis of this sort has not been performed for the Advanced Range Telemetry Tier II case at this time. For the case of Receiver-B, it outperforms the FM demodulator by several dB at BER $10^{-6}$, and is only 2 and 3 dB inferior to the optimum maximum likelihood sequence estimating receiver for N=2 and N=1 respectively (64 and 16 states each).

Up to this point, consideration has only been given to the performance with respect to the case of perfect symbol timing and carrier phase. Since the motivation for a noncoherent receiver is the case where the carrier phase is not known and assumed to be varying, a simple model will be introduced for variations in the carrier phase. Let $$\phi_n = \phi(nT) = \phi_{n-1} + v_n \bmod 2\pi \quad (21)$$

where $\{v_n\}$ are independently and identically distributed Gaussian random variables with zero mean and variance $\delta^2$. This models the phase noise as a first order Markov process with Gaussian transition probability distribution. For perfect carrier phase tracking, $\delta=0$.

FIG. 3A shows the performance of the Advanced Range Telemetry Tier II waveform with the two receivers for the case where $\delta=5°$/symbol. Among the noncoherent receivers, the traditional FM demodulator performs the best for this particular channel model. What is particularly interesting is that in the case of Receiver-B, the shorter observation interval (N=1) outperforms the longer one (N=2). Also, a lower value of a=0.75 was found to yield the best performance under these channel conditions. These performance characteristics of Receiver-B would appear to be a result of the very structure of the receiver. Under these channel conditions, lowering the value of the forget factor reduces the dependence of the branch metrics on previous noisy observations. Increasing the observation length under these channel conditions would only exacerbate the situation by increasing the reliance on previous noisy observations. FIG. 3B shows that when δ is increased to 10°/symbol the performance of Receiver-B with N=2 is the worst (note that a was further reduced to 0.6). For both values of δ, Receiver-B with N=1 (2 states) outperformed Receiver-A with N=5 (4096 states), and the FM demodulator outperformed them all.

Turning now to FIG. 2, there is shown a block diagram of an embodiment of a trellis-based lock detector 100. As shown in FIG. 1, the trellis-based lock detector 100 includes receiving means 102 and observation means 104. The receiving means 102 is adapted for receiving an incoming signal, the incoming signal being at least one of the following: a digitally modulated informative signal, and a noise signal. Those skilled in the art will recognize, that the receiving means 102 is capable of being implemented as any suitable receiver known in the art suitably adapted for receiving digitally modulated signals. The observation means 104 is adapted for performing multi-symbol observations on received digitally modulated signals. The observation means 104 is suitably employed as part of a maximum likelihood sequence estimation device having a trellis structure. For illustration purposes, one section of an 8-state trellis structure 200 placed along a time axis t is shown in FIG. 2. The states 202 from one time index to the next time index are connected with branches 204. Each branch has a starting time index 206 and an ending time index 208. A skilled artisan will also recognize that for the purpose of this invention the observation means 104 is capable of further including means for adjusting a multi-symbol observation length (not shown in the drawing).

Figure 4:
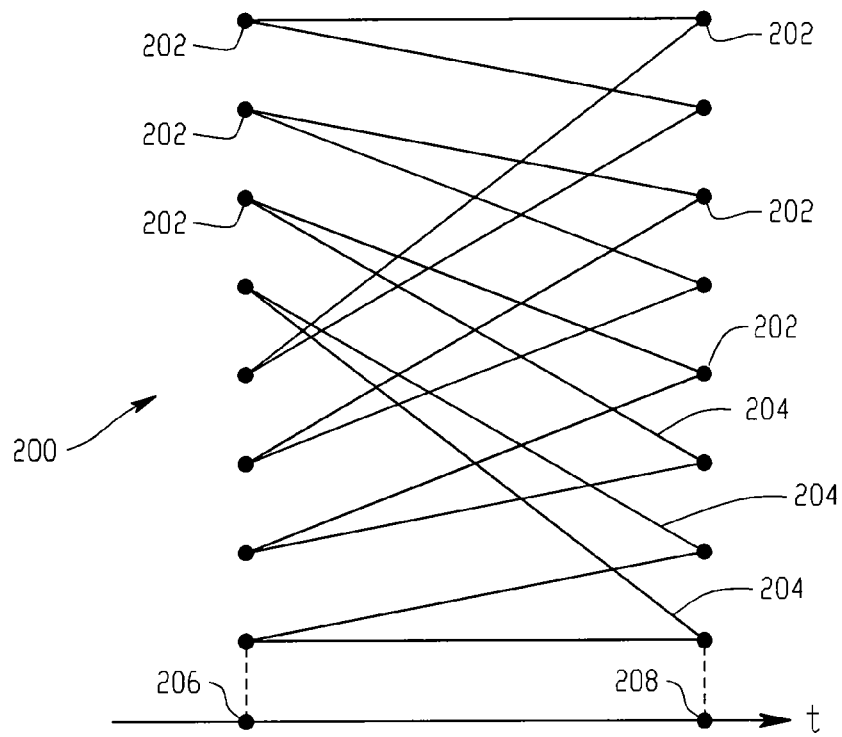
FIG. 4 is a diagram illustrating one section of an 8-state trellis in accordance with the subject application.

With continued reference to FIG. 2, the trellis-based lock detector 100 also includes cumulative means 106 and memory means 108. The cumulative means 106 is adapted for acquiring cumulative observation data by recursively computing observation data corresponding to multi-symbol observations. The cumulative means 106 is further adapted for recursively computing a global survivor for consecutive time indexes. Those skilled in the art will appreciate that the global survivor is suitably recursively computed as a maximum cumulative branch metric corresponding to a given time index for consecutive branches of the trellis structure. Those skilled in the art will further recognize that the cumulative means 106 is capable of being employed as any computing means known in the art adapted for computing branch metric, such as add-compare-select means, well known in the art. Preferably, the cumulative means 106 is part of a maximum likelihood sequence estimation device having a trellis structure, such as illustrated in FIG. 4. The memory means 108 is adapted for storing cumulative observation data. Those skilled in the art will recognize that suitable memory means includes volatile memory, non-volatile memory, flash memory, optical memory, or the like, or any combination thereof.

The trellis-based lock detector 100 further includes evaluating means 110 and decision means 112. The evaluating means 110 is adapted for evaluating the stored cumulative observation data. The evaluating means 110 is further adapted for backtracing a global survivor for a given time index to a previous time index. The evaluating means 110 is further adapted for determining a global survivor condition for the previous time index. As will be appreciated by those skilled in the art, the condition is selected from the group consisting of: a true condition, and a false condition. The evaluating means 110 is suitably adapted for recursively computing the number of consecutive true conditions for a global survivor over an averaging time.

The decision means 112 is adapted for making a decision on a status of the trellis-based lock detector 100 based on the evaluation of acquired cumulative observation data. As will be recognized by a skilled artisan, the decision means 112 is further adapted for selecting a status of the trellis-based lock detector 100 by comparing the computed number of consecutive true conditions over the averaging time with at least one threshold data. The decision is made by selecting from the group consisting of: a lock status, and unlock status. Those skilled in the art will appreciate, that the evaluating means 110 and decision means 112 are capable of advantageously being part of a maximum likelihood sequence estimation device having a trellis structure, such as illustrated in FIG. 4. Those skilled in the art will also recognize, that the operation of the lock detector 100 of the present invention utilizes trellis-based detection techniques known as the Viterbi Algorithm.

Referring now to operation of the trellis-based lock detector 100 illustrated in FIG. 2, the operation commences by the receiving means 102 receiving an incoming signal, the incoming signal being at least one of the following: a digitally modulated informative signal, and a noise signal. As will be appreciated by those skilled in the art, the carrier of the digitally modulated signal is any transmissible carrier such as an electrical, electromagnetic, or optical signal conveyed by electrical or optical cable, or by radio or other means. As mentioned above, the type of digital modulation is capable of being, for example, but without limitation, pulse width modulation/frequency modulation (PCM/FM), Feher-patented quadrature-phase-shift keying (FQPSK), shaped offset quadrature-phase-shift keying (SOQPSK), and all forms of continuous phase modulation (CPM). Multi-symbol observations are performed on the received signal by the observation means 104.

Figure 5:
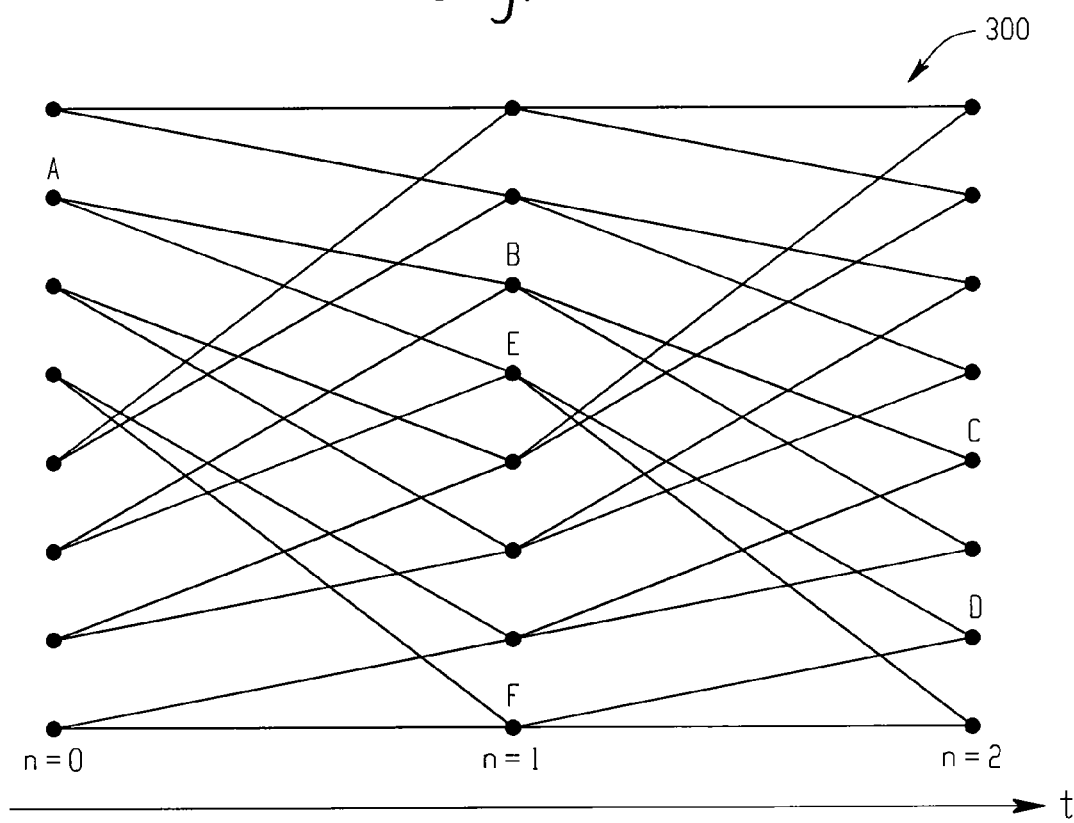
FIG. 5 is a diagram illustrating the test condition for a global survivor in accordance with the subject application.

Next, cumulative observation data is acquired by cumulative means 106. The cumulative means 106 recursively computes observation data corresponding to the multi-symbol observations. In other words, the cumulative means 106 computes a branch metric for each branch in the trellis structure. In accordance with the present application, the cumulative means 106 computes a global survivor for consecutive time indexes. Those skilled in the art will appreciate that the global survivor is suitably recursively computed by the cumulative means 106 as a maximum cumulative branch metric corresponding to a given time index for consecutive branches of the trellis structure. Acquired cumulative observation data corresponding to the multi-symbol observations is then stored in a traceback matrix in the memory means 108. For illustration purposes, an exemplary traceback matrix 300 placed along a time axis t is shown in FIG. 5. In FIG. 5, A, B, and C are the global survivors GSn−2 GSn−1, and GSn, for time indexes: n=0, n=1, and n=2, respectively.

The cumulative observation data stored in the traceback matrix, is then evaluated by the evaluating means 110. The procedure of evaluating provided by the evaluation means 110 includes backtracing a global survivor for a given time index to a previous time index. The procedure of evaluating provided by the evaluation means 110 further includes determining a global survivor condition for the previous time index. As will be appreciated by those skilled in the art, the condition is selected from the group consisting of: a true condition, and a false condition. The procedure of determining a global survivor condition will be explained with reference to FIG. 5. In accordance with the present invention, the evaluating means 110 backtraces the following condition:

$$\text{Traceback}[n][GS_n] == GS_{n-1} \qquad (22)$$

As will be appreciated by those skilled in the art, the evaluating means 110 determines whether or not the global survivor at time index n can trace back to the previous global survivor. FIG. 5 gives examples of the two possible outcomes (true or false) for the condition in (1). As mentioned above, A, B, and C are the global survivors for n=0, n=1, and n=2, respectively (i.e. $GS_{n-2}$, $GS_{n-1}$, and $GS_n$). In this instance the value stored in Traceback[2][C] is B, and since B is $GS_{n-1}$ the condition in (1) evaluates to true. Now instead, suppose D is the global survivor for n=2 ($GS_n$). In this case, the value stored in Traceback[2][D] can only be E or F; therefore, the condition in (1) evaluates to false, since neither E or F are $GS_{n-1}$.

The motivation behind this condition is the following. If no digitally modulated signal is present at the input of the receiving means 102, then the trellis-based lock detector 100 is just tracking a noise signal. When a noise signal is tracked, the global survivor will hop to a different "lineage" frequently; therefore, the probability of a long succession of true evaluations of (1) (i.e. a long "streak") is very small. On the other hand, when the global survivors follow a consistent path over time (a long streak), this implies that a meaningful informative signal is present at the input of the receiving means 102.

Thus, the evaluating means 110 advantageously recursively compute the number of consecutive true conditions for a global survivor over an averaging time. Next, the decision means 112 makes a decision on a status of the trellis-based lock detector 100 based on the evaluation of acquired cumulative observation data. As will be recognized by a skilled artisan, the decision means 112 selects a status of the trellis-based lock detector 100 by comparing the computed number of consecutive true conditions for a global survivor over an averaging time with at least one threshold data. The decision is made by selecting from the group consisting of: a lock status, and unlock status.

Those skilled in the art will appreciate that the trellis-based lock detector of the present invention is capable of using, for example and without limitation, the following averaging algorithm:

Parameters:

---

Len = length of averaging buffer;
LockThresh = threshold to declare trellis lock;
UnlockThresh = threshold to declare trellis unlock;
Initializations:
Sum = 0;
CurStreak = 0;
StreakBuffer = 1xLen array of zeros;
LockStatus = false;
At each time step n, do the following:
// Maintain a running count of the number of times
// in a row the condition in (1) is true
IF[Condition (1) is true]
    CurStreak = CurStreak + 1;
ELSE
    CurStreak = 0;
END
// Find the average value of CurStreak by summing
// a number of recent values
Sum = Sum + CurStreak − StreakBuffer[n modulo Len];
StreakBuffer[n modulo Len] = CurStreak;

---

// Declare Lock if this average is over a certain threshold
IF[Sum > LockThresh]
    LockStatus = true;
END
// Declare Unlock if this average is below a certain threshold
IF[Sum < UnlockThresh]
    LockStatus = false;
END
Typical Parameter Values:
Len = 512;
LockThresh = 2*Len = 1024;
UnlockThresh = 1*Len = 512;

---

The values in the above example mean that 512 recent values of the streak are being averaged. The streak needs to be an average of 2 to declare a lock status, and if it falls below 1, an unlock status is declared.

Those skilled in the art will recognize, that although the subject invention is capable of being implemented using just one threshold data for making a decision, preferably, two separate thresholds are used for indication of a lock status, and of an unlock status. The latter prevents the detector from erroneous detection when the signal quality is marginal.

Figure 6:
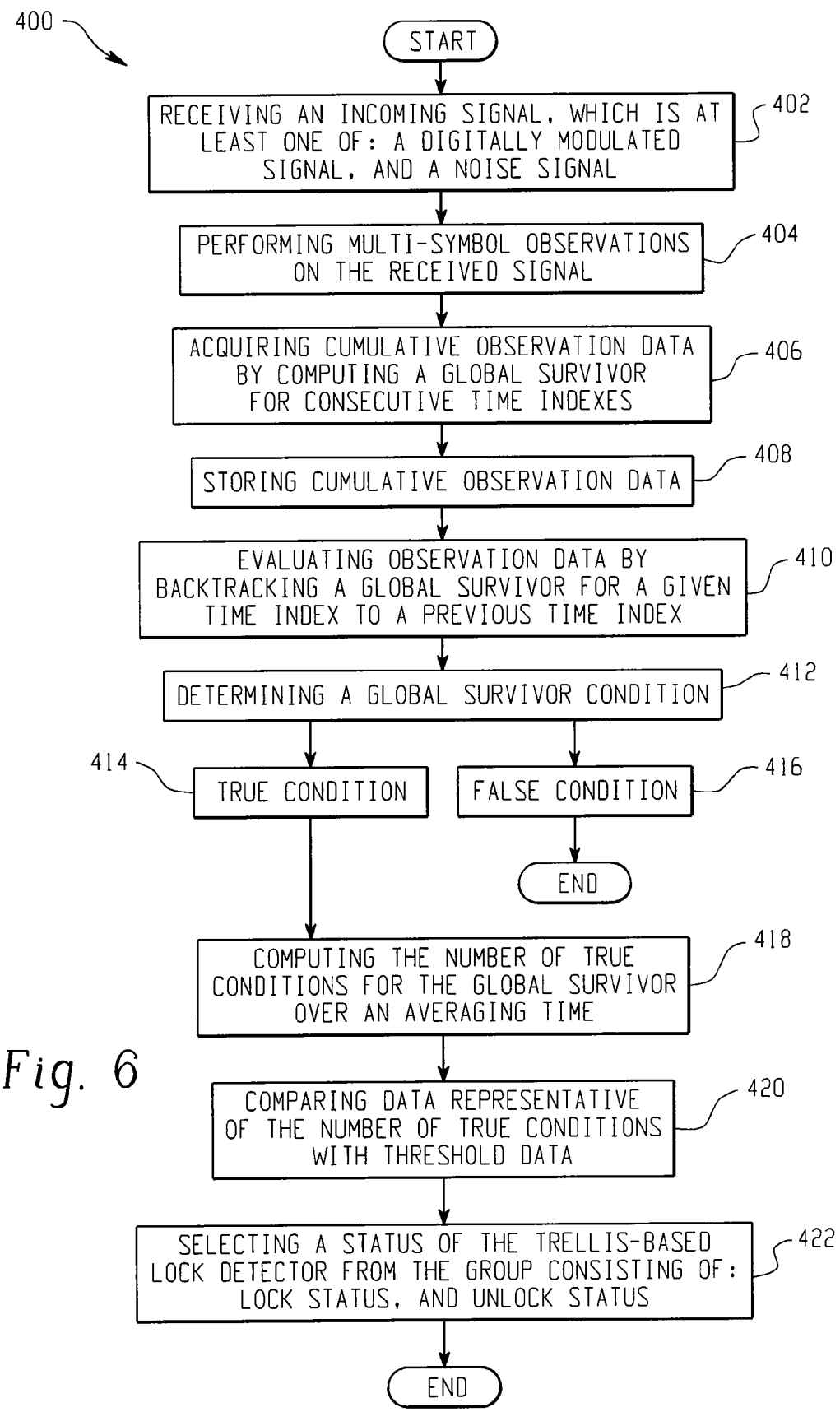
FIG. 6 is a flowchart illustrating a trellis-based method for lock detection according to the subject application.

As will be further appreciated by a skilled artisan, the proposed algorithm has extremely low complexity; it requires only simple add-compare-select operations and some memory. The performance of the trellis-based lock detector of the invention does not depend on received signal levels, automatic gain control settings, and the like, and provides reliable discrimination between a carrier with a very poor signal to noise ratio, and no signal whatsoever. The foregoing device 100 illustrated in FIG. 2, will better be understood when viewed in conjunction with the methodologies set forth in FIG. 6. Turning now to FIG. 6, there is shown a flowchart 400 illustrating a trellis-based method for carrier lock detection according to the subject application. Beginning at step 402, the process of lock detection commences by receiving an incoming signal with the aid of the receiving means 102. As previously mentioned, the incoming signal is at least one of the following: a digitally modulated informative signal, and a noise signal. As will be appreciated by those skilled in the art, the carrier of the digitally modulated signal is any transmissible carrier such as an electrical, electromagnetic, or optical signal conveyed by electrical or optical cable, or by radio or other means. As mentioned above, the type of digital modulation is capable of being, for example, but without limitation, pulse width modulation/frequency modulation (PCM/FM), shaped offset QPSK (SOQPSK), Feher-patented quadrature-phase-shift keying (FQPSK), and all forms of continuous phase modulation (CPM).

Flow then proceeds to step 404, at which multi-symbol observations are performed on the received signal with the aid of the observation means 104. At step 406 cumulative observation data is acquired with the aid of cumulative means 106. At this step, the cumulative means 106 computes a global survivor for consecutive time indexes. Those skilled in the art will appreciate that the global survivor is suitably recursively computed with the aid of the cumulative means 106 as a maximum cumulative branch metric corresponding to a given time index for consecutive branches of the trellis structure.

At step 408, acquired cumulative observation data corresponding to the multi-symbol observations is stored in a traceback matrix with the aid of the memory means 108. Flow then proceeds to step 410, at which the cumulative observation data stored in the traceback matrix, is then evaluated with the aid of the evaluating means 110 by backtracing a global survivor for a given time index to a previous time index. At step 412 a global survivor condition for the previous time index is determined with the aid of the evaluating means 110. As will be appreciated by those skilled in the art, the condition is selected with the aid of the evaluating means 110 from the group consisting of: a true condition at step 414, and a false condition at step 416. If a false condition is selected at step 416, the procedure terminates. If a true condition is selected at step 414, flow then proceeds to step 418, at which the number of consecutive true conditions for a global survivor over an averaging time is computed with the aid of the evaluating means 110. Next, flow proceed to step 420, at which data representative of the number of consecutive true conditions for a global survivor over an averaging time is compared with at least one threshold data with the aid of the decision means 112. The procedure ends at step 422 by selecting a status of the trellis-based lock detector 100 with the aid of the decision means 112. The status is selected from the group consisting of: a lock status, and unlock status.

The invention extends to computer programs in the form of source code, object code, partially compiled or otherwise, and code intermediate sources, or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

One aspect is based on a concept that for a noise signal entering the lock detector, in contrast to an informative signal, the probability of a long succession of true evaluations of a global survivor is very small. The latter allows for using data, representative of the number of consecutive true conditions for a global survivor over an averaging time, as an informative parameter for making a decision on the status of lock detection.

The embodiments extend to computer programs in the form of source code, object code, partially compiled or otherwise, and code intermediate sources, or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical, electromagnetic, or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing descriptions of the preferred embodiments have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

Having thus described the embodiments, it is now claimed:

1. A continuous phase modulation detector comprising:
   receiver means having a trellis structure and being adapted for receiving digitally modulated signals having a generally continuous phase;
   observation means adapted for performing multi-symbol observations on received digitally modulated signals;
   memory means adapted for storing historic observation data corresponding to multi-symbol observations performed by the observation means;
   adjustment means adapted for selectively adjusting the observation means in accordance with the stored historic observation data;
   cumulative means adapted for acquiring cumulative observation data by recursively computing observation data corresponding to multi-symbol observations performed by the observation means;
   wherein the memory means is adapted for storing cumulative observation data corresponding to multi-symbol observations performed by the observation means, in a traceback matrix;
   evaluating means adapted for evaluating the cumulative observation data stored in the traceback matrix; and
   decision means adapted for making a decision on a status of the trellis-based lock detector by selecting from the group consisting of: a lock status, and unlock status, based on the evaluation of acquired cumulative observation data.

2. The continuous phase modulation detector of claim 1, wherein the receiver means is noncoherent.

3. The continuous phase modulation detector of claim 2 wherein the adjustment means includes means for selectively adjusting at least one of the receiver means or the memory means recursively in accordance with cumulatively acquired observation data.

4. The continuous phase modulation detector of claim 3 further comprising means adapted for selectively pruning the cumulatively acquired observation data in accordance with a selected pruning factor.

5. The continuous phase modulation detector of claim 4, wherein the receiver means further includes a trellis-structured means.

6. The continuous phase modulation detector of claim 5, wherein the adjustment means further includes means for adjusting a multi-symbol observation length.

7. The continuous phase modulation detector of claim 6, wherein the observation means further includes evaluating means adapted for evaluating acquired cumulative observation data.

8. The continuous phase modulation detector of claim 7, wherein the evaluating means are adapted for evaluating acquired cumulative complex-valued observation data.

9. The continuous phase modulation detector of claim 7, wherein the evaluating means are adapted for evaluating acquired cumulative real-valued observation data.

10. The continuous phase modulation detector of claim 2, wherein the adjustment means includes means for adjusting a multi-symbol observation length.

11. The continuous phase modulation detector of claim 10, wherein the observation means further includes evaluating means adapted for evaluating acquired cumulative observation data.

12. The continuous phase modulation detector of claim 1 wherein the cumulative means is further adapted for recursively computing a global survivor for consecutive time indexes as a maximum cumulative branch metric corresponding to a given time index for consecutive branches of the trellis structure.

13. The continuous phase modulation detector of claim 12 wherein the evaluating means is further adapted for backtracing a global survivor for a given time index to a previous time index, and wherein the evaluating means is further adapted for determining a global survivor condition for the previous time index, the condition being selected from the group consisting of: a true condition, and a false condition.

14. The continuous phase modulation detector of claim 13 wherein the evaluating means is further adapted for:
   recursively computing the number of consecutive true conditions for a global survivor over an averaging time, and
   obtaining data representative of the number of consecutive true conditions for a global survivor over an averaging time.

15. The continuous phase modulation detector of claim 14 wherein the decision means is further adapted for comparing data, representative of the number of consecutive true conditions for a global survivor over an averaging time, with at least one threshold data, selecting thereby the status of the trellis-based lock detector based on a magnitude relation between data, representative of the number of consecutive true conditions for a global survivor over an averaging time, and the at least one threshold data.

16. The continuous phase modulation detector of claim 1 wherein the observation means further includes means for adjusting a multi-symbol observation length.

17. The continuous phase modulation detector of claim 1 wherein the adjustment means is adapted for selectively adjusting the observation means based on the stored historic observation data in accordance with a predetermined performance.

18. A method of continuous phase modulation detection comprising:
   receiving digitally modulated signals having a generally continuous phase;
   performing multi-symbol observations on received digitally modulated signals;
   acquiring cumulative observation data resulting from multi-symbol observations, wherein the acquiring includes acquiring cumulative observation data by recursively computing observation data corresponding to the multi-symbol observations;
   storing historic cumulative observation data corresponding to multi-symbol observations;
   selectively adjusting the multi-symbol observations in accordance with the stored historic cumulative observation data;
   evaluating acquired cumulative observation data; and
   making a decision on a status of the digitally modulated informative signal by selecting from the group consisting of: a lock status, and unlock status, based on the evaluation of acquired cumulative observation data.

19. The method of continuous phase modulation detection of claim 18 wherein the selectively adjusting the multi-symbol observations further includes selectively adjusting the receiver means recursively in accordance with cumulatively acquired observation data.

20. The method of continuous phase modulation of claim 19 further comprising the step of selectively pruning the cumulatively acquired observation data in accordance with a selected pruning factor.

21. The method of continuous phase modulation detection of claim 20, wherein the step of receiving digitally modulated signals is based on non-coherent reception.

22. The method of continuous phase modulation detection of claim 21, wherein the step of selectively adjusting the multi-symbol observations further includes adjusting of a multi-symbol observation length.

23. The method of continuous phase modulation of claim 22 further comprising the step of evaluating acquired cumulative observation data.

24. The method of continuous phase modulation of claim 23, wherein the step of evaluating acquired cumulative observation data includes evaluating complex-valued observation data.

25. The method of continuous phase modulation of claim 23, wherein the step of evaluating acquired cumulative observation data includes evaluating real-valued observation data.

26. The method of continuous phase modulation detection of claim 18, wherein the step of receiving digitally modulated signals is based on non-coherence reception.

27. The method of continuous phase modulation detection of claim 26, wherein the step of selectively adjusting the multi-symbol observations further includes adjusting of a multi-symbol observation length.

28. The method of continuous phase modulation of claim 27 further comprising the step of evaluating acquired cumulative observation data.

29. The method of continuous phase modulation of claim 28, wherein the step of evaluating acquired cumulative observation data includes evaluating complex-valued observation data.

30. The continuous phase modulation detector of claim 27, wherein the evaluating means are adapted for evaluating acquired cumulative complex-valued observation data.

31. The method of continuous phase modulation detection of claim 18 wherein the acquiring cumulative observation data further comprises recursively computing a global survivor for consecutive time indexes as a maximum cumulative branch metric corresponding to a given time index for consecutive branches of the trellis structure.

32. The method of continuous phase modulation detection of claim 31 wherein the evaluating further comprises:
   backtracing a global survivor for a given time index to a previous time index; and determining a global survivor condition for the previous time index, the condition being selected from the group consisting of: a true condition, and a false condition.

33. The method of continuous phase modulation detection of claim 32 wherein the evaluating further comprises:
recursively computing the number of consecutive true conditions for a global survivor over an averaging time; and
obtaining data representative of the number of consecutive true conditions for a global survivor over an averaging time.

34. The method of continuous phase modulation detection of claim 33 wherein the making a decision further comprises comparing the obtained data with at least one threshold data, selecting thereby the status of the digitally modulated informative signal based on a magnitude relation between data, representative of the number of consecutive true conditions for a global survivor over an averaging time, and the at least one threshold data.

35. The method of continuous phase modulation detection of claim 18 wherein the selectively adjusting the multi-symbol observations includes selectively adjusting the multi-symbol observations based on the stored historic cumulative observation data in accordance with a predetermined performance.

* * * * *